(12) United States Patent
Kienzle et al.

(10) Patent No.: US 9,005,732 B2
(45) Date of Patent: Apr. 14, 2015

(54) FRICTION-TOLERANT DISKS MADE OF FIBER-REINFORCED CERAMIC

(75) Inventors: Andreas Kienzle, Balgheim (DE); Ingrid Kratschmer, Biberbach (DE)

(73) Assignee: Audi AG, Ingolstadt (DE)

( * ) Notice: Subject to any disclaimer, the term of this patent is extended or adjusted under 35 U.S.C. 154(b) by 1064 days.

(21) Appl. No.: 12/000,057

(22) Filed: Dec. 7, 2007

(65) Prior Publication Data

US 2008/0138578 A1 Jun. 12, 2008

(30) Foreign Application Priority Data

Dec. 8, 2006 (DE) .......................... 10 2006 057 939

(51) Int. Cl.
| | | |
|---|---|---|
| D06N 7/04 | (2006.01) |
| F16D 69/02 | (2006.01) |
| C04B 35/573 | (2006.01) |
| C04B 35/626 | (2006.01) |
| C04B 35/634 | (2006.01) |
| C04B 35/80 | (2006.01) |
| C04B 35/83 | (2006.01) |
| C04B 37/00 | (2006.01) |
| B32B 5/12 | (2006.01) |
| D01F 9/12 | (2006.01) |
| B32B 18/00 | (2006.01) |

(52) U.S. Cl.
CPC ................ *F16D 69/023* (2013.01); *B32B 5/12* (2013.01); *D01F 9/12* (2013.01); *B32B 18/00* (2013.01); *C04B 35/573* (2013.01); *C04B 35/62635* (2013.01); *C04B 35/62655* (2013.01); *C04B 35/6269* (2013.01); *C04B 35/62695* (2013.01); *C04B 35/63416* (2013.01); *C04B 35/63476* (2013.01); *C04B 35/806* (2013.01); *C04B 35/83* (2013.01); *C04B 37/005* (2013.01); *C04B 37/008* (2013.01); *C04B 2235/3826* (2013.01); *C04B 2235/422* (2013.01); *C04B 2235/425* (2013.01); *C04B 2235/428* (2013.01); *C04B 2235/5248* (2013.01); *C04B 2235/526* (2013.01); *C04B 2235/5264* (2013.01); *C04B 2235/5296* (2013.01); *C04B 2235/604* (2013.01); *C04B 2235/6562* (2013.01); *C04B 2235/963* (2013.01); *C04B 2237/083* (2013.01); *C04B 2237/365* (2013.01); *C04B 2237/385* (2013.01); *C04B 2237/61* (2013.01); *F16D 2200/0047* (2013.01)

(58) Field of Classification Search
USPC ................................ 428/294, 332, 359, 66.2
See application file for complete search history.

(56) References Cited

U.S. PATENT DOCUMENTS

| | | | |
|---|---|---|---|
| 5,532,054 A * | 7/1996 | Koba et al. ................. 428/299.1 |
| 2004/0126535 A1* | 7/2004 | Sommer et al. .............. 428/66.2 |
| 2006/0076699 A1* | 4/2006 | Domagalski et al. ........ 264/29.2 |

FOREIGN PATENT DOCUMENTS

| | | |
|---|---|---|
| DE | 692 15 457 T2 | 4/1997 |
| DE | 197 11 829 C1 | 9/1998 |
| DE | 197 11 831 A1 | 9/1998 |
| DE | 100 48 012 A1 | 4/2002 |
| DE | 101 18 921 A1 | 11/2002 |
| DE | 102 34 400 B3 | 3/2004 |
| DE | 600 13 204 T2 | 12/2004 |
| DE | 10 2004 012 407 A1 | 7/2005 |
| DE | 100 66 044 B4 | 8/2005 |
| EP | 1 386 896 A | 2/2004 |
| EP | 1 640 633 A | 3/2006 |
| EP | 1 640 633 A1 | 3/2006 |
| EP | 1 645 671 A | 4/2006 |
| EP | 1 645 671 A1 | 4/2006 |

OTHER PUBLICATIONS

German Search Report, German Patent Office, Dec. 8, 2006.

* cited by examiner

*Primary Examiner* — Ellen S Wood
*Assistant Examiner* — Anthony J Frost
(74) *Attorney, Agent, or Firm* — Novak Druce Connolly Bove + Quigg LLP

(57) ABSTRACT

A composition comprising polymer-bound fiber tows containing carbon fibers, the polymer-bound fiber tows having an average length of 3 mm to 50 mm measured in the fiber direction, and an average bundle thickness of 0.1 mm to 10 mm measured perpendicular to the fiber direction, and in which at least 75% of all polymer-bound fiber tows have a length that is at least 90% and not greater than 110% of the average length combined with a carbon-ceramic material.

2 Claims, No Drawings

FRICTION-TOLERANT DISKS MADE OF FIBER-REINFORCED CERAMIC

CROSS-REFERENCE TO RELATED APPLICATIONS

This application claims priority from German Application No. 10 2006 057 939.9 filed Dec. 8, 2006, hereby incorporated by reference in its entirety.

The invention relates to friction-tolerant disks, in particular brake disks and clutch disks, made of fiber-reinforced ceramic, and methods for manufacturing same.

BACKGROUND OF THE INVENTION

Brake disks made of fiber-reinforced ceramic designed as an annular disk fastened to a hub are usually composed of multiple layers, whereby the outer layers which come into contact with the brake shoes are to be optimized with respect to their tribological properties, whereas the inner layer or layers have essentially mechanical functions (transfer of the brake torque to the axle) and thermal functions (heat dissipation). The same tribological and mechanical functions must also be met by a clutch disk. The materials are correspondingly optimized for these functions.

German Unexamined Patent application DE 100 48 012 A1 describes carbon-ceramic brake disks having friction layers containing carbon fibers in the form of bundles with lengths of 0.25 mm to 8 mm, the bundle widths of the carbon fiber bundles being between 0.001 mm and 1.5 mm. Carbon-ceramic brake disks are known from DE 101 18 921 A1, for example, having at least a three-layer structure, the two outer layers interacting with the brake shoes as friction layers and thus achieving the tribological function, and at least one inner layer having ribs with a radial or involute curvature and separated by cavities designed as channels; whereby air passes through these channels and assists in heat dissipation, the inner layer being made of fiber-reinforced ceramic material which contributes to mechanical stability.

In accordance with these various functions, for the friction layer (tribological function) and for the support body (mechanical function) fiber-reinforced ceramic materials are used which differ in the type and quantity of reinforcing fibers. Long fibers having lengths of greater than 6 mm contribute in particular to mechanical stability, whereas short fibers having lengths of less than 6 mm are preferably used for friction layers. The fiber content in the friction layers is generally less than in the support bodies, which are subjected to mechanical stress.

According to the teaching of DE 100 48 012 A1, fiber fractions having lengths in the range of 0.25 mm to 8 mm are used for the friction layer, whereas fiber fractions having lengths in the range of 4 mm to 20 mm are used for the support bodies. These fractions are obtained from ground fiber bundles, in this case the fiber bundles being produced from bundled continuous fibers (fiber cable) by impregnation with resins or pitch as binder, carbonization of the binder, and, if needed, repetition of the impregnation and carbonization. On account of the grinding step, the length as well as the thickness of the fiber bundles are subject to statistical fluctuations which result in nonuniform material properties, particularly with respect to the tribological properties, whereby the fluctuations in the material properties may be intensified by further processing, for example.

The object, therefore, is to improve the tribological properties of friction layers made of fiber-reinforced ceramic by using fiber bundle functions having the maximum possible homogeneous or narrowly distributed bundle lengths and bundle widths. It is also desirable to further improve the mechanical properties of the support bodies.

Polymer-bound fiber tows are known from EP 1 645 671 A1, having an average length of 3 mm to 50 mm measured in the fiber direction, and an average bundle thickness of 0.1 mm to 10 mm measured perpendicular to the fiber direction, and in which at least 75% of all fiber tows have a length that is at least 90% and not greater than 110% of the average length.

It has been found that such polymer-bound fiber tows may be advantageously used for manufacturing carbon-ceramic brake disks, and in the production of friction layers as well as the support bodies for carbon-ceramic brake disks. The referenced polymer-bound fiber tows may also be advantageously used for manufacturing clutch disks of carbon fiber-reinforced ceramic (carbon-ceramic clutch disks).

SUMMARY OF THE INVENTION

The invention therefore relates to the use of polymer-bound fiber tows containing carbon fibers, the polymer-bound fiber tows having an average length of 2 mm to 80 mm measured in the fiber direction, and an average bundle thickness of 0.1 mm to 15 mm measured perpendicular to the fiber direction, and in which at least 75% of all polymer-bound fiber tows have a length that is at least 90% and not greater than 110% of the average length, in the manufacture of carbon-ceramic brake disks and carbon-ceramic clutch disks. According to the invention, mixtures of two or more fiber tows having different lengths and/or widths may also be used.

The invention further relates to the use of the above-described polymer-bound fiber tows for producing friction layers for carbon-ceramic brake disks and carbon-ceramic clutch disks, the length of the fiber tow (parallel to the fiber direction) preferably being 2 mm to 6 mm, and the width of the fiber tow (greatest extension perpendicular to the fiber direction) preferably being 0.1 mm to 1.5 mm.

The invention further relates to the use of the above-described polymer-bound fiber tows for producing support bodies for carbon-ceramic brake disks and carbon-ceramic clutch disks, the length of the fiber tow (parallel to the fiber direction) preferably being 3 mm to 60 mm, and the width of the fiber tow (greatest extension perpendicular to the fiber direction) preferably being 1 mm to 15 mm, the ratio of the length to the width of the fiber bundle being from 3:1 to 10:1.

DETAILED DESCRIPTION OF THE PREFERRED EMBODIMENTS OF THE INVENTION

The polymer-bound fiber tows are produced by drawing carbon multifilament strands through a resin bath (solution or low-viscosity melt of a heat-curing resin or a thermoplastic polymer) and compressing same on a belt press, resulting in fiber bands which preferably have a thickness of 100 μm to 200 μm. The resin-impregnated fiber band is simultaneously cured and bonded as it passes through the belt press with heating (in the case of heat-curing resins), or is bonded by cooling to a temperature below the melting temperature of the thermoplastic polymer. In the next step the fiber bands are cut to a defined length and width in a stamping or cutting process. For use according to the invention in friction layers of carbon-ceramic brake disks and carbon-ceramic clutch disks, the width of the fiber bundles preferably ranges from 0.1 mm to 1.5 mm, and the length, from 2 mm to 6 mm. On the other hand, for use in support bodies a fiber tow is preferred having a length of 3 mm to 60 mm (parallel to the fiber direction), and a width of 1 mm to 15 mm (greatest extension perpendicular to the fiber direction).

For further processing, these fiber bundles are mixed with a heat-curing resin and optionally silicon powder in an intensive mixer. Graphite, silicon carbide, and coke, all in the form of fine-particle powders with particle sizes in the range of preferably 5 μm to 500 μm, in particular from 10 μm to 250 μm, may be used as further additives. The total mass fraction of these further additives is preferably 1% to 10%, but preferably not greater than 15%. The molding compound may be set, for example, by adding an aqueous solution of polyvinyl alcohol to produce a granulate, which after drying of the granulate particles is suitable for automatic filling. Alternatively, the dry mixture may be set by adding glycol, an oil, or a liquid wax to enable dust-free processing.

For production of a preform for a friction layer, this mixture (referred to below as "friction layer mixture") may be filled into a cylindrical press mold and pressed into a cylindrical ring having a thickness of 2 mm, for example, by application of temperature and pressure from a hydraulic press. This cylindrical ring may then be adhesively bonded directly to a prepared cylindrical support body ring on which an adhesive layer of a phenol resin and silicon powder, for example, has been applied in a uniform thickness by use of a notched spatula. The adhesive bonding to a composite disk is achieved by application of pressure and temperature, thereby curing the adhesive layer and joining the support body and friction layer preform to one another.

According to the invention, the preform for the friction layer, produced as described above, and the separately produced support body ring may each be adhesively bonded in the "CFK" state, i.e., in the form of a thermally cured fiber-reinforced polymer body that has been cooled to room temperature. Another possibility is to separately convert the preform for the friction layer and the support body ring from the CFK state by carbonization, i.e., heating with the exclusion of oxidizing agents, to temperatures of approximately 750° C. to approximately 1300° C., preferably approximately 900° C. to 1200° C., to produce "CFC bodies" (carbon fiber-reinforced porous carbon), and to join same only in this state to produce a composite disk.

After (re)carbonization, the composite disk produced according to one of these methods, comprising a support body ring and at least one preform for the friction layer adhesively bonded to a top surface of the support body ring, is converted to a body containing silicon carbide by treatment with liquid silicon, whereby at least a portion of the carbon from the resin or polymer which results during carbonization reacts with the silicon to produce silicon carbide. For this purpose, the carbonized composite disk is preferably placed in a graphite crucible and covered with silicon particles, or placed on wicks standing in a crucible filled with Si granulate. The carbonized composite disk is infiltrated with liquid silicon after heating to a temperature above the melting temperature of silicon (1420° C.), at reduced pressure or in a vacuum. After the final treatment, the resulting siliconized disks have a crack-free surface in the region of the top surfaces of the friction layers.

The brake disks obtained in this manner exhibit uniform frictional characteristics in all regions of the AK master test program used in the brake bench test. In the fading test (friction factor as a function of the operating temperature) the disks exhibit a friction value characteristic with a consistently high friction factor curve (coefficient of friction μ of 0.4 to 0.45). According to the tests performed in conjunction with the invention, the stability of the friction layer depends on the quantity of silicon powder added in the friction layer mixture.

At 40 fading cycles, a 5% mass fraction of silicon powder in the friction layer mixture results in a distinct roughening of the surface, with an increase in the lining wear. For a 10% mass fraction of silicon in the mixture, a similar roughening is not observed until 80 cycles. This beneficial effect of the addition of silicon powder is observed up to mass fractions of approximately 50% in the friction layer mixture. A 10% to 40% silicon mass fraction in the friction layer mixture has proven to be particularly advantageous.

The invention is further explained by means of the following examples. Unless expressly noted otherwise, information in "%" represents the mass fraction of the particular material in a mixture.

Example 1

Production of the Fiber Bundle

Carbon multifilament strands containing approximately 50,000 filaments each were drawn through a resin bath (Norsophen® PF N 1203 phenol resin, Cray Valley) and compressed on a belt press, resulting in fiber bands with a thickness of approximately 200 μm. The resin-impregnated fiber band was simultaneously cured by passing through the belt press while heating to approximately 180° C. The cured fiber bands were then cut to a defined length of 6.0 mm and a width of 1.0 mm in a stamping process.

Example 2

Production of the Friction Layer Mixture 50 g silicon granulate (Silgrain® from Elkem, grain size up to 70 [μ?][1]m was premixed with 350 g of a dry phenol resin powder (Bakelite® 223) and 650 g of the fiber bundles from Example 1 (1 mm wide, 6 mm long, and 0.2 mm thick) in an intensive mixer from Eirich at a rotational speed of 300 min$^{-1}$. For the granulation, a total of 300 g of an aqueous solution of polyvinyl alcohol (Mowiol® 4-88, polyvinyl alcohol mass fraction in the solution approximately 5%, viscosity of a 4% solution in water at 20° C.: 4 mPa·s, hydrolysis rate approximately 88 cmol/mol, from Kuraray Specialties Europe GmbH) was added to the mixture over a period of 5 minutes at a rotational speed of 1200 min$^{-1}$. The granulate obtained was then dried to a residual moisture content of approximately 2.5%.

[1] Translator's note: omission in source text

Example 3

Production of the Preform for the Friction Layer 350 g of the dried granulate from Example 2 was uniformly filled into a cylindrical press mold having an outer diameter of 350 mm and an inner cylinder diameter of 180 mm, and pressed for 10 minutes at a pressure of 1.7 MPa and a temperature of 150° C. until the resin cured. After curing, a cylindrical disk 3 mm thick and having an outer diameter of 350 mm and an inner diameter of 180 mm was obtained.

Example 4

Production of the Preform for the Support Body

A mixture of 15 kg of cured fiber bands with dimensions of 50 mm×15 mm and 5 kg of the fiber bands with dimensions of 5 mm×1.5 mm, produced analogously to the method described in Example 1, and 10.3 kg of a Novolak resin (Norsophen® PF N 1203) were placed in an intensive mixer as in Example 2, and after addition of 6 kg of the aqueous polyvinyl alcohol solution described in Example 2 were granulated for approximately 5 minutes at a rotational speed of 1600 min$^{-1}$. The granulate obtained was dried to a residual moisture content of approximately 2%. From this granulate a cylindrical support body having a thickness of 50 mm, an inner circumference of 180 mm, and an outer circumference of 350 mm was pressed and cured over a period of 30 minutes at 150° C. and a pressure of 1.5 MPa.

Example 5

Adhesive Bonding of Carbonized Friction Layers to a Support Body

Two friction layer preforms produced according to Example 2 were transferred to an oven and heated at a rate of 2 K/min to a temperature of 900° C. under a protective gas atmosphere, thus converting the organic components to amorphous carbon. After cooling and removal from the oven, each of these disks was then adhesively bonded onto a support body, produced according to Example 4 and carbonized as described above, on a respective top surface. A phenol resin to which a 30% mass fraction of a fine-particle silicon powder (average particle diameter approximately 100 [μ?]$^2$m had been added was used as adhesive. For curing of the adhesive, these joined disks were pressed on a press at a temperature of 140° C. and a pressure of 1 MPa.

[2] Translator's note: omission in source text

Example 6

Siliconization of the Joined Disk

The joined disk (approximately 2.2 kg) from Example 5 was placed on three porous carbon wicks in a graphite crucible, covered with 2800 g silicon granulate (Silgrain® from Elkem, grain size up to 2 mm), and heated under vacuum (pressure approximately 5 hPa=5 mbar) to a temperature of 1700° C., at heating rates of 5 K/min from room temperature to 1420° C. and 2 K/min from 1420° C. to 1700° C. The silicon melted above 1420° C. and was drawn by capillary forces through open pore channels into the component, where it reacted with carbon to produce silicon carbide. After cooling and removal from the oven, for final machining the C/SiC component formed was resurfaced on the functional surfaces (the top surfaces of the cylindrical ring).

The invention claimed is:
1. A siliconized disk comprising:
a friction layer; and
a support body ring,
wherein the friction layer is adhesively bonded to the support body ring,
wherein a surface of the siliconized disk has a coefficient of friction of 0.4 to 0.45,
wherein the siliconized disk is produced by a process comprising:
producing a preform by applying pressure and temperature to the support body ring, a mixture, and an adhesive layer, the adhesive layer being disposed between the support body ring and the mixture,
wherein the adhesive layer comprises a phenol resin and silicon powder, wherein the mixture comprises:
a heat curing resin,
1 to 50% by weight of a powder,
wherein the powder has a particle size of from 5 to 500 μm,
wherein the powder comprises one selected from the group consisting of graphite, silicon, carbide, and coke, and
a plurality of polymer-bound fiber tows each comprising carbon fibers,
wherein the plurality of polymer-bound fiber tows comprises at least a first polymer-bound fiber tow and a second polymer-bound fiber tow,
wherein the first polymer-bound fiber tow has a first length measured in the fiber direction,
wherein the second polymer-bound fiber tow has a second length measured in the fiber direction,
wherein the first length and the second length are different, wherein the plurality of polymer-bound fiber tows have an average length of 3 mm to 50 mm measured in the fiber direction,
wherein the plurality of polymer-bound fiber tows have an average bundle thickness of 0.1 mm to 10 mm measured perpendicular to the fiber direction,
wherein in at least 75% of the plurality of polymer bound fiber tows have a length that is at least 90% and not greater than 110% of the average length,
heating the preform to a temperature of 750 to 1300 degrees Celsius, infiltrating a top surface of the friction layer with liquid silicon.
2. The siliconized disk according to claim 1, wherein the powder comprises silicon.

* * * * *